(No Model.) 2 Sheets—Sheet 1.

N. GILLESPIE.
ANIMAL MUZZLE.

No. 489,184. Patented Jan. 3, 1893.

Witnesses:
Frank C. Curtis
John T. Booth

Inventor:
Nelson Gillespie
by Geo. A. Mosher
Atty.

(No Model.) 2 Sheets—Sheet 2.

N. GILLESPIE.
ANIMAL MUZZLE.

No. 489,184. Patented Jan. 3, 1893.

Witnesses:
Frank C. Curtis
John T. Booth

Inventor:
Nelson Gillespie
by Geo. A. Mosher
Atty.

UNITED STATES PATENT OFFICE.

NELSON GILLESPIE, OF HOOSICK FALLS, NEW YORK, ASSIGNOR OF ONE-HALF TO CHESTER GILLESPIE, OF SAME PLACE.

ANIMAL-MUZZLE.

SPECIFICATION forming part of Letters Patent No. 489,184, dated January 3, 1893.

Application filed November 30, 1891. Serial No. 413,489. (No model.)

*To all whom it may concern:*

Be it known that I, NELSON GILLESPIE, a citizen of the United States, residing at Hoosick Falls, county of Rensselaer, and State of New York, have invented certain new and useful Improvements in Animal-Muzzles, of which the following is a specification My invention relates to such improvements and consists of the novel construction and combination of parts hereinafter described and subsequently claimed.

Reference may be had to the accompanying drawings, and the letters of reference marked thereon, which form a part of this specification.

Similar letters refer to similar parts in the several figures therein.

Figure 1:
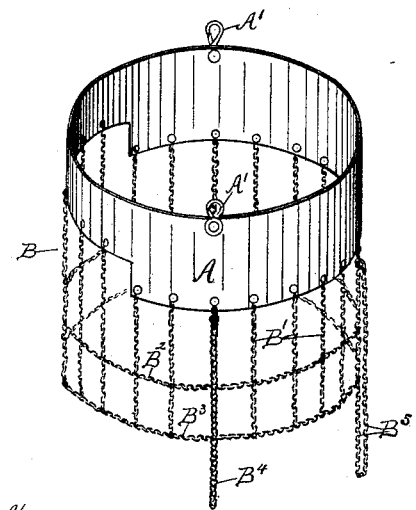
Figure 2:
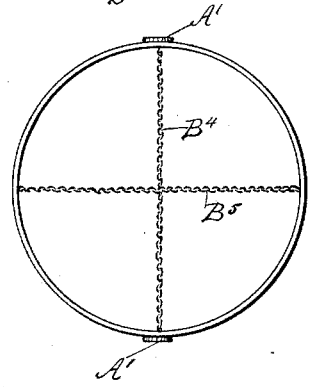
Figure 3:
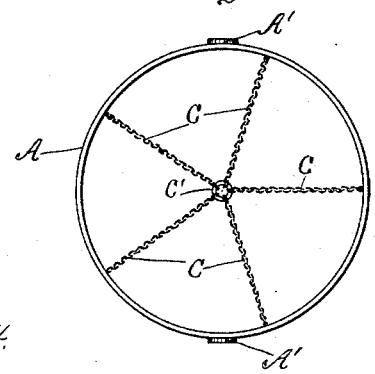
Figure 4:
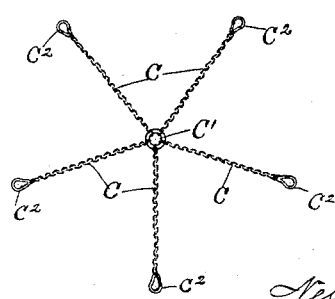
Figure 5:
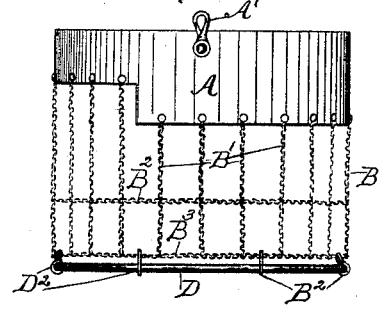
Figure 6:
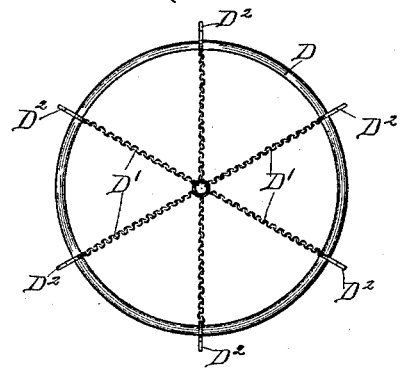
Figure 7:
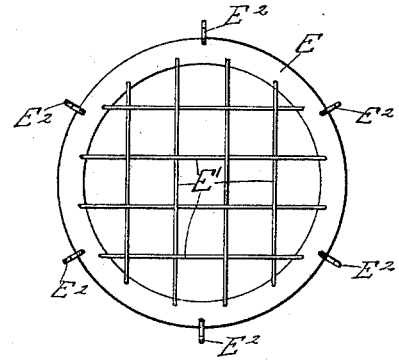

Figure 1 of the drawings is a view in perspective of my improved muzzle showing the link-guard vertically pendent from its support, and the lower end open. Fig. 2 is a top plan view of the muzzle shown in Fig. 1 with the lower end closed. Fig. 3 is a top view of the muzzle with the lower end closed by a detachable link-diaphragm. Fig. 4 is a plan view of the link-bottom detached. Fig. 5 is a view in side elevation showing the muzzle closed at its lower end by a ring having a recticulate diaphragm. Fig. 6 is a top plan view of the diaphragm-ring detached. Fig. 7 is a plan view of a modified form of ring and diaphragm.

The subject matter of this application comprises an improvement upon the construction shown and described by me in United States Letters Patent No. 457,193, dated August 4, 1891, to which patent reference may be had in connection with this description. The construction shown in such patent comprised a link-apron or guard pendent from a supporting band to hang down below and back of the horse's mouth, to prevent the horse from biting his blanket, without interfering with his freedom to eat and breathe.

The subject of my present application relates to muzzles adapted for use by other animals than horses, and for other purposes than to simply prevent biting a blanket. I prefer to continue the link-guard all the way round the animal's mouth in the form of a boot-leg or tube, whereby a vicious horse is prevented from biting his keeper as well as his blanket.

I also provide a detachable mechanism for closing the lower end of the tubular guard, thereby forming a complete recticulate muzzle which will not interfere with breathing and drinking and will permit the animal to eat slowly. A rigid muzzle closed at the lower end will prevent the horse from eating at all, while my collapsible link-muzzle will, when closed, permit a horse to eat, but will prevent him from indulging in the habit, common to many horses, of eating too fast.

The five radial chains form a link-diaphragm which is adapted to be hooked onto the lower part of the muzzle guard. This diaphragm may be supported by a ring or hoop, D, secured to the bottom edge of the collapsible guard by a plurality of connections, as shown in Fig. 5, in which case the ring holds the bottom edge of the collapsible guard in an approximately circular position conforming in shape to the ring, D. The ring may be detachable and the connections formed by hooks, $D^2$, adapted to hook onto the guard-chain. The device when so constructed forms a detachable link-diaphragm bottom provided with hooks for securing to the muzzle. The connections between the collapsible guard and ring may be made permanent when desired, and the ring serves to distend and support the lower edge of the guard and prevent collapsion of the same laterally, allowing the horse to eat slowly through the link diaphragm. When the ring is permanently secured to the collapsible guard, the chains, D', shown in Fig. 6, are preferably omitted, the value of the ring in such a case being largely to give form to the bottom edge of the guard, and form a ready means by which a detachable link diaphragm may be attached to the muzzle to close the bottom of the same. The exact form of the ring is immaterial, and the ring may be round in cross-section or flattened as shown in Fig. 7. When the ring is made detachable from the muzzle it is preferred to provide the ring with a diaphragm having openings therein adapted to allow the horse to eat slowly, as before described; but the function of the ring, so far as it relates to its use as a distending device or support for the lower edge of the collapsible guard, renders it immaterial whether such ring have a diaphragm or not; or if one is used whether it is a link diaphragm, or a diaphragm of woven wires, as shown in Fig. 7, in which figure, E represents the ring, E', the wires forming the woven diaphragm, and E², attaching hooks.

I am aware that a perforated removable bottom has been used upon muzzles prior to my invention. My improved bottom permits the animal to feed therethrough at the same time checking too rapid eating and in case the distending hoop be omitted it is adapted to collapse with the muzzle guard. The links are for these purposes so arranged and connected as to leave considerable spaces between them and form an open meshed diaphragm or fabric.

What I claim as new and desire to secure by Letters Patent is

1. In an animal muzzle, the combination with a support and means for securing the support upon the animal's head; of a collapsible link-guard pendent from the support extending around and below the animal's mouth; and detachable link mechanism for closing the lower end of the guard, substantially as described.

2. The animal muzzle having the separate transverse flexible link diaphragm detachably supported by the muzzle guard, said transverse link diaphragm having an open mesh to permit an animal to eat slowly through the same; substantially as set forth.

In testimony whereof I have hereunto set my hand this 23d day of November, 1891.

NELSON GILLESPIE.

Witnesses:
JOHN J. CARL,
FRED. AUSTIN.